United States Patent Office.

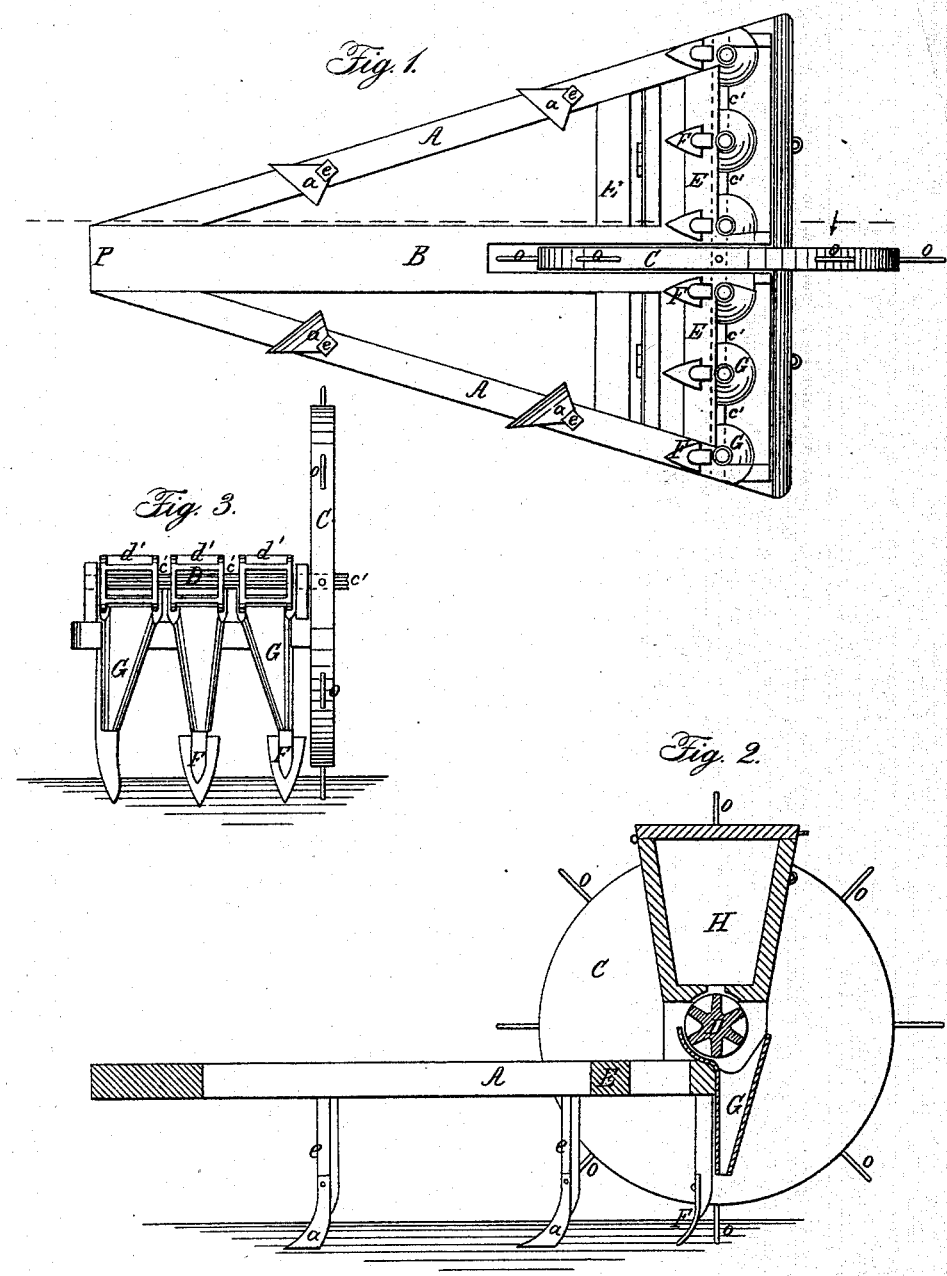

JAMES G. McGREW, OF CALEDONIA, MINNESOTA.

*Letters Patent No. 61,847, dated February 5, 1867.*

---

IMPROVEMENT IN SEEDING MACHINES.

---

The Schedule referred to in these Letters Patent and making part of the same.

---

TO ALL WHOM IT MAY CONCERN:

Be it known that I, JAMES G. McGREW, of Caledonia, in the county of Houston, and State of Minnesota, have invented a new and improved Seeding Machine; and I do hereby declare that the following is a full, clear, and exact description thereof, reference being had to the accompanying drawings, forming part of this specification.

The principal object of this invention is to construct a machine by which seeds, particularly wheat, may be sown in drills among standing corn, so that the corn may be left standing until the spring frosts are over, thereby protecting the young wheat plant from being injured by the winter and spring frosts.

My invention consists, first, in attaching to the under side of a triangular frame a series of shovels or ploughs, which are so arranged that they will throw towards the centre of the machine or into the old furrow the soil which by ploughing has been thrown into ridges along the rows of corn; second, my invention consists in attaching to the centre of the shaft on which the cylinders are hung, which convey the seed from the hopper above to the seed tubes below, one wheel provided with spokes on its edges, which spokes catch in the ground and insure the turning of the wheel, and, consequently, of the cylinders. By using a single wheel in the centre of the machine, instead of two on each side, as was heretofore done, I am enabled to leave the corn-stalks standing, besides not bringing the weight of the whole machine upon what is left of the ridges. The triangular shape of the frame gently bends towards one side any stalks that may be leaning too far towards the furrow. Thus it will be seen that by this machine the corn is not in the least disturbed, while by the use of the wheel in the centre the operation of seeding is made perfect.

To enable others skilled in the art to make and use my invention, I will proceed to describe its construction and operation.

Figure 1 is a bottom plan view of my improved machine.
Figure 2 is a longitudinal vertical sectional elevation of the same taken from the line $x$ $x$.
Figure 3 is a part of a rear elevation of the machine.
Like letters refer to like parts in each of the figures.

A represents a triangular wooden frame pointing forward; a centre-piece, B, running from the point of the forward angle back to the rear end of the frame. At the rear end of this said piece of timber is a slot that extends from the rear end forward to a distance sufficient to admit the wheel C. To the rear end of the said frame A are secured bearings, raised a short distance above the frame, in which runs the axle C' of the seed cylinder D and wheel C. To this axle is secured the traction-wheel C, that runs upon the ground and gives motion to the said seed cylinder D. In the periphery or to the rim of the wheel C are secured spokes O, that take to the ground in all its sinuosities, so that whenever the frame is moved the cylinder also moves, so that there is no failure in the operation of the machine. Cross-timbers E E are framed into the sides of the frame A and centre-timber B near the rear end of the machine for the purpose of adding strength to the frame A. $a$ $a$ $a$ $a$ are triangular shovels, secured to standards $e$ $e$ $e$ $e$, which are secured to the side pieces of its frame A. These shovels throw the ground into the old furrow, taking it from the old ridges upon which the corn stands, and stand in relation to each other upon each side of the frame A so as to spread the ground evenly and uniformly and not to leave too deep furrows in the fresh-turned ground, as the furrows necessary for the wheat are made by the cultivator teeth or furrowing-ploughs, represented by F, and located immediately in front of the seed tubes G. The seed tubes G are located and secured to the rear cross-timber of the frame A, and immediately under the cylinder D. This cylinder D is constructed with cells or recesses, as shown in fig. 3, there being shown three sections $d'$ of them upon each side of the traction-wheel C, although any desired number of them may be used. H H are the hoppers or seed boxes, located and secured directly over the cylinder D, so that as the machine is moved forward the seed fills the cells in the cylinder and is carried around under the bottom of the seed box until it reaches the tube G, through which the seed drops into a furrow made by the ploughs F. It will be understood that in the bottom of the seed boxes H H are openings that correspond with the cells in the cylinder, so that each cell is filled with seed as the cylinder is made to revolve by the traction-wheel C. The seed boxes H H are provided with lids or covers hung in hinges so that the seed may be kept dry.

The operation of my invention is perfect and simple, and consists in filling the said boxes H H with seed when the team is attached by any well-known means to the front end of the machine at P. As the machine proceeds across the field the traction-wheel C puts in motion the cylinder D, and, as it revolves, the cells are filled with seed and carry it around to the tubes G, through which it is conducted to the ground.

Having thus described my invention, what I claim as new, and desire to secure by Letters Patent, is—

1. The application of the traction-wheel C provided with spokes O to the triangular frame A, and to the axle C' of the cylinder D, substantially as and for the purpose herein shown and described.

2. I claim the application of the shovel ploughs *a a* to the triangular frame A when in combination with the wheel C, substantially as and for the purpose herein shown and described.

JAMES. G. McGREW.

Witnesses:
  B. F. LOUTHAIN,
  MILTON McGREW.